Dec. 22, 1964    R. L. RENFROE    3,162,476
LIFTING CLAMP

Filed Aug. 28, 1961    3 Sheets-Sheet 1

INVENTOR
Raymond L. Renfroe

BY *Irons, Birch, Swindler & McKie*
ATTORNEYS

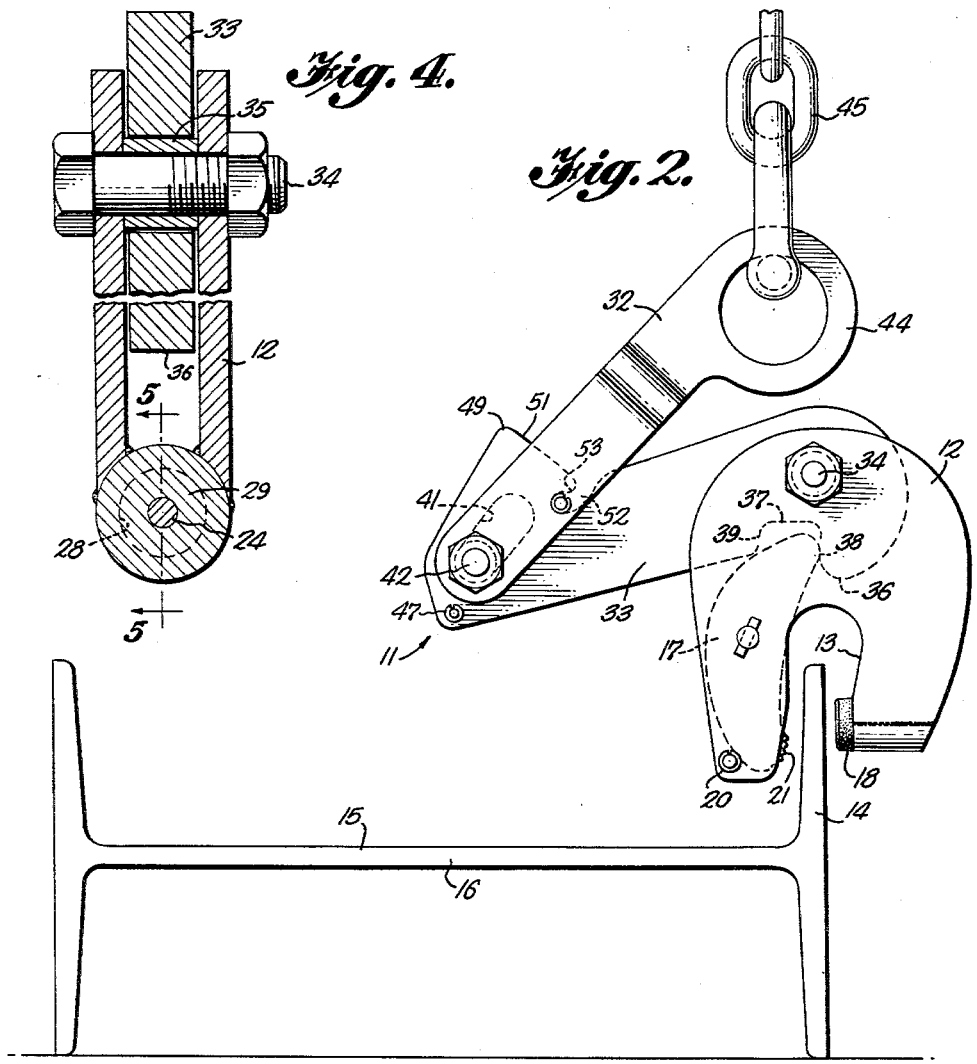

Dec. 22, 1964   R. L. RENFROE   3,162,476
LIFTING CLAMP
Filed Aug. 28, 1961   3 Sheets-Sheet 3

INVENTOR
*Raymond L. Renfroe*

BY *Irons, Birch, Swindler & McKie*
ATTORNEYS 3,162,476
LIFTING CLAMP
Raymond L. Renfroe, 1926 Spearing St., Jacksonville, Fla.
Filed Aug. 28, 1961, Ser. No. 134,378
6 Claims. (Cl. 294—101)

This invention relates to clamps and more particularly to clamps for lifting such articles as structural steel beams.

A wide variety of clamps for lifting heavy articles such as steel plates, beams and the like have been used for many years. Such clamps usually must be lifted from the work by an operator after it has been moved to the desired location. Not only is substantial labor time consumed by operator removal but it frequently is dangerous for the operator to manually dislodge the clamp from the work because of the particular location where it is deposited.

Certain prior art clamps have been developed which are adapted to be locked in released condition when the work is lowered to the supporting surface. In general, however, heretofore available devices of such character have been attended by various disadvantages including undependability, undue complexity and weight thereby making them expensive to manufacture and maintain and difficult to operate.

To overcome the disadvantages of the prior art devices it is an object of the present invention to provide an improved lifting clamp which may be retained in released condition when the work is deposited on a supporting surface and which is inexpensive, easy to maintain and operate and attended by great dependability and versatility.

Another object of the invention is to provide such a clamp which is automatically released when the work is deposited on the supporting surface.

A further object of the invention is to provide an improved structural beam clamp.

A still further object of the invention is to provide an improved structural beam clamp which is attachable to the beam flange but enables the lifting force to be applied through a line near the center of gravity of the beam when the beam web is substantially horizontal.

One aspect of the invention is generally directed to a lifting clamp which comprises a clamp body defining a slot to receive an article to be lifted, a pair of opposed jaws connected to said body on opposite sides of said slot, lever means connected at its inner end to said body and extending transversely of said slot to bring said jaws into an inactive relation and a gripping relation when the outer end of said lever means is raised and depressed respectively, a clevis having at its upper end a lifting connection and at its lower end a pivotal connection to the outer end of said lever means, said clevis having an outwardly pivoted position relative to said lever means where lifting force applied to said lifting connection exerts a substantial moment on said lever means to bring said jaws into gripping relation, and releasable means to retain said clevis in an inwardly pivoted position relative to said lever means where lifting force applied to said lifting connecton exerts substantially no moment on said lever means to leave said jaws in inactive relation. The clevis retaining means preferably is automatically engageable in response to the release of the lifting force on the lifting connection as an article engaged by said jaws is lowered onto a supporting surface.

The invention having been broadly described, a preferred specific embodiment will now be discussed in detail with reference to the accompanying drawings in which:

FIGURE 2 is an elevational view of the same clamp immediately after deposition of the beam on a supporting surface with the clamp jaws released;

FIGURE 4 is a sectional view taken along the line 4—4 of FIGURE 1;

FIGURE 5 is a sectional view taken along the line 5—5 of FIGURE 4; and

Figure 3:
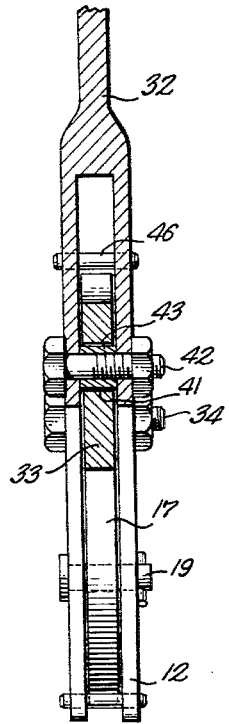
FIGURE 3 is a sectional view taken along the line 3—3 of FIGURE 1.

Illustrated in the drawings is a clamp generally referred to by the reference numeral 11. The clamp 11 includes a clamp body 12 having a generally U-shaped configuration to define a slot 13. Slot 13 is sufficiently wide to receive with substantial play the flange 14 of a wide flange beam 15. The upper portion of the slot walls are relieved to permit lateral movement of the top of the beam flange. The slot 13 should be sufficiently deep so that the major portion of the flange 14 on one side of the web 16 of the beam 15 extends into the slot. It will be understood that many different articles can be lifted by a clamp according to the invention, particularly, I-beams, H-beams, channels, angles and the like. Such clamp is also capable of lifting plates.

Figure 1:
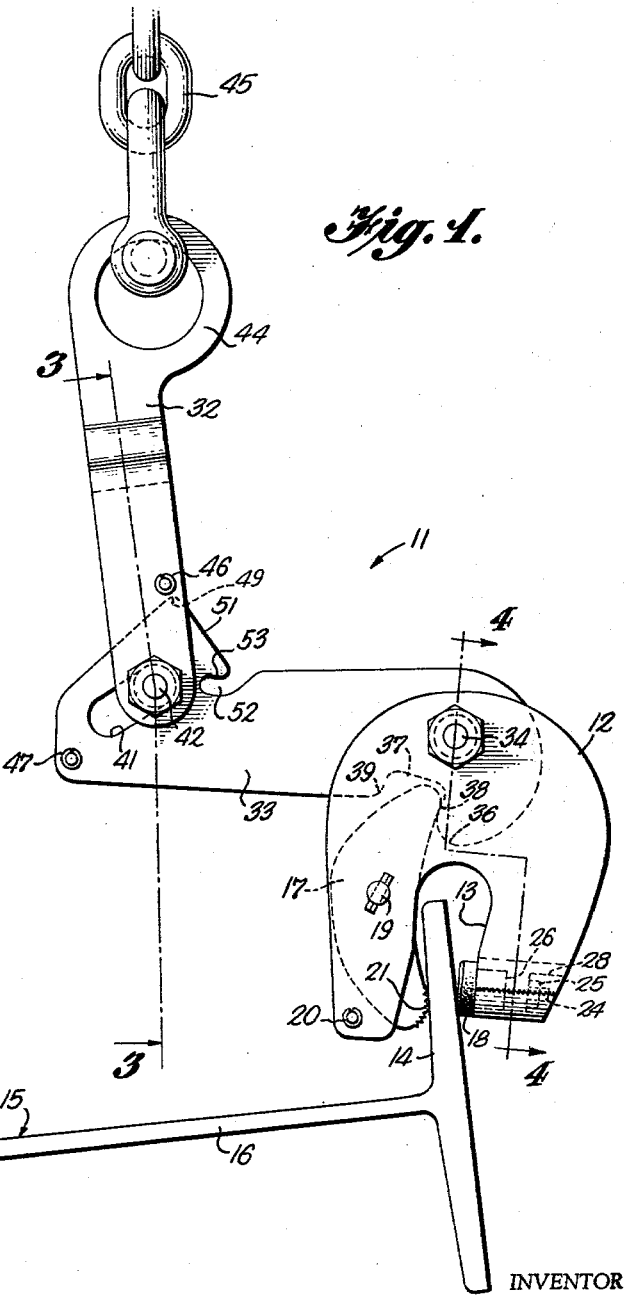
FIGURE 1 is an elevational view of a clamp according to the present invention lifting a structural steel beam.

The body 12 includes front and rear walls defining a hollow space in between as best illustrated in FIGURE 4. Connected to the body 12 on opposite sides of the slot 13 are a pair of jaws 17 and 18. The jaw 17 is generally kidney shaped as shown in FIGURE 1 and is pivotally mounted inside the hollow body 12 by a pin 19 which permits the gripping surface 21 of the jaw 17 to be moved laterally in the slot 13 between an open inactive position as shown in FIGURE 2 and a closed gripping position relative to the jaw 18 as shown in FIGURE 1. Outward movement of the jaw 19 is limited by a stop pin 20 mounted in the body 12. The opposing jaw 18 is fixed against all movement except that it is rotatable about its own axis to prevent a beam flange or other structure which is held between the jaws from "walking" out of a gripped relationship by oscillation of the beam. The swivel jaw 18 is preferably formed of a hard steel material and is provided with a pair of concentric annular gripping ridges 22 and 23. The swivel jaw 18 is connected to the body 12 by a bolt 24 and a loosely tightened nut 25. The body wall facing the slot 13 is countersunk at 26 to receive the reduced diameter base 27 of the swivel jaw 18. The body is also countersunk at 28 to receive the nut 25 with the partition 29 between the countersunk openings 27 and 28 providing an attaching wall for the bolt 24 and nut 25.

The clamp 11 is also provided with a shackle assembly comprising a clevis 32 and a shackle or lever arm 33. The inner end of the lever arm 33 is pivotally connected to the body arm 12 by a bolt 34 which extends through openings in the front and rear walls of the body 12.

Between the bolt 34 and the lever arm 33 is a suitable bushing 35 which leaves the lever 33 free to pivot in the general plane of the body 12. At the lower portion of the inner end of the lever arm 33 below the bolt 34 there is formed a protruding nose 36 and immediately outward thereof a recess 37. The outer face of the nose 36 defines a cam surface 38 which engages the upper end of the movable jaw 17 which protrudes into the recess 37. Thus when the lever arm 33 is raised the cam surface 38 urges the movable jaw 17 into gripping position. When the lever arm 33 is depressed the opposing face of the recess 37 forms a cam surface 39 which engages the back of the upper portion of the movable jaw 17 and urges such jaw into inactive position as shown in FIGURE 2.

The outer end of the lever arm 33 is provided with an inclined slot 41 to which the bifurcated lower end of the clevis 32 is connected by a bolt 42 which extends through the slot 41. Positioned around the bolt 42 is a bushing 43 to provide a bearing for rotation of the clevis 32. The bolt 42 and bushing 43 are free to slide in the slot 41 for a purpose to be described hereinafter. The clevis is free to pivot in the general plane of the lever arm 33 and the body 12, the pivotal connections formed by the bolts or pins 34 and 42 being parallel. The upper end of the clevis 32 defines a ring 44 which forms a lifting connection for attachment of a lifting chain 45 or a cable or the like through which a lifting force may be applied to the clamp 31.

Extending through the bifurcated lower portion of the clevis 32 is a pin 46 which is positioned above the upper surface of the outer end of the lever arm 33. Outward pivotal movement of the clevis 32 is limited by engagement of the outer surface of the clevis with stop pin 47 connected to the outer end of the lever arm 33. An inclined cam surface 51 extends downwardly and inwardly from the top of an upward protrusion 49 at the outer end of the lever arm 33. The cam surface 51 terminates in a recess 52 which extends longitudinally outwardly in the lever arm 33.

When a lifting force is applied to the clevis lifting connection 44, the lever arm 33 will be raised to close the movable jaw 17. When the clamp 31 is in lifting position as shown in FIGURE 1 with the jaws gripping a beam 14 the pin 46 is above the protrusion 49. When the beam is lowered to a supporting surface and the lifting force is removed, the clevis moves downward by gravity permitting the lever arm to rotate downwardly. Such movement of the lever arm takes the protrusion 49 to the outside of the pin 46. Continued lowering of the clevis causes the bolt 42 to move downwardly and outwardly in the slot 41 until the pin 46 engages the cam surface 51. The operator may facilitate the settlement of the pin 46 on the cam surface 51 rather than outwardly of the protrusion 49 by appropriate manipulation of the lifting chain as it is lowered. The pin 46 then slides down the cam surface thereby causing the clevis to pivot inwardly. The pin 46 continues to ride down the cam surface 51 until it falls into the recess 52. The bolt 42 slides further outwardly and downwardly in the slot 41 which enables the pin 46 to move outwardly into the recess 52 and be restrained against vertical movement out of such recess by the protruding portion or detent 53 which defines the upper wall of the recess 52. When the pin 46 is engaged by the recess 52 the lifting connection 44 is close to a vertical line which extends through the bolt 34. Thus, as shown in FIGURE 2, when a vertical lifting force is applied to the lifting connection 44 with the slot 13 directed downwardly there is substantially no moment applied to the lever arm 33. Thus such lever arm is not raised to actuate the movable jaw 17. Accordingly, the movable jaw 17 remains in inactive position, as shown in FIGURE 2, while the entire clamp is elevated.

Further when the clamp is in lifting position and the pin 46 is in the recess 53, the lifting connection 44 is located close to a vertical line passing through the center of gravity of the clamp 11 so that there is substantially no tilting of the slot 13 from a vertical position when the lifting force is applied to the connection 44. Thus there is no tendency for the jaws to exert a torque gripping action on the flange 14.

In the operation of lifting the beam 15 the clevis 32 is placed in outwardly pivoted position with the lever arm 33 extending inwardly over the web 16 as shown in FIGURE 1. The clamp 11 with the slot 13 directed downwardly is then lowered over the beam 15 so that the flange 14 extends into slot 13 between the jaws 17 and 18. A lifting force is then applied through the chain 45 to the lifting connection 44 of the clevis 32. Since such force is applied along a vertical line a substantial distance horizontally outwardly of the vertical line passing through the bolt 34 a substantial moment is applied to the lever arm 33 thereby raising it to urge the cam surface 38 against the upper portion of the jaw 17 and forcing the gripping surface 21 into gripping relation with the jaw 18 to securely grasp the flange 14. Upward movement of the chain 45 results in lifting of the beam 15. Because of the lever action the gripping force exerted by the jaws is several times the weight of the beam. Since the lever arm 33 extends transversely a substantial distance, approaching one half of the depth of the beam, horizontally away from the slot 13 the lifting force is applied near the center of gravity of the beam 14 thus reducing the tendency for the beam to rotate in a counterclockwise direction as viewed in FIGURE 1. The beam is moved to the desired location and lowered to a supporting surface. As the lifting force is released from the lifting connection 44, the clevis descends by gravity and the pin 46 rides down the cam surface 51 until it reaches the recess 52 whereupon the bolt 42 slides downwardly and outwardly into slot 41 and the pin 46 moves outwardly into the recess 52. Thus the clevis is automatically retained in the position shown in FIGURE 2. When a subsequent lifting force is applied through the chain 45 there is insufficient moment applied to the lever arm 33 to close the jaw 17 and no tendency for the clamp to rotate to cause torque gripping of the flange by the jaws. Consequently, the jaws remain in inactive open position and the clamp is lifted free of the flange 15 without the necessity of release of the jaws by an operator.

It will be understood that other means to retain the clevis in inwardly pivoted inactive position may be substituted for the pin and slot connection which is illustrated.

Figure 8:
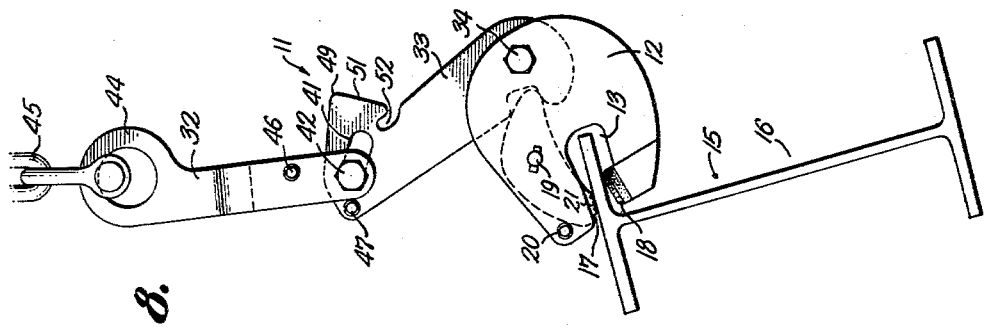
FIGURES 6, 7 and 8 are side elevational views showing in sequence a clamp according to the invention moving a beam from a horizontal to a vertical position.
Figure 7:
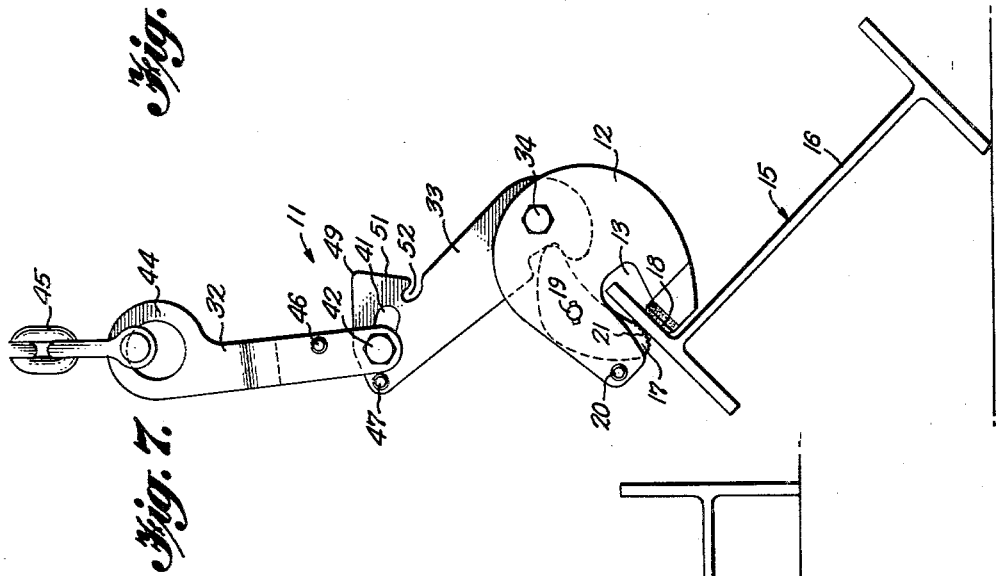
Figure 6:
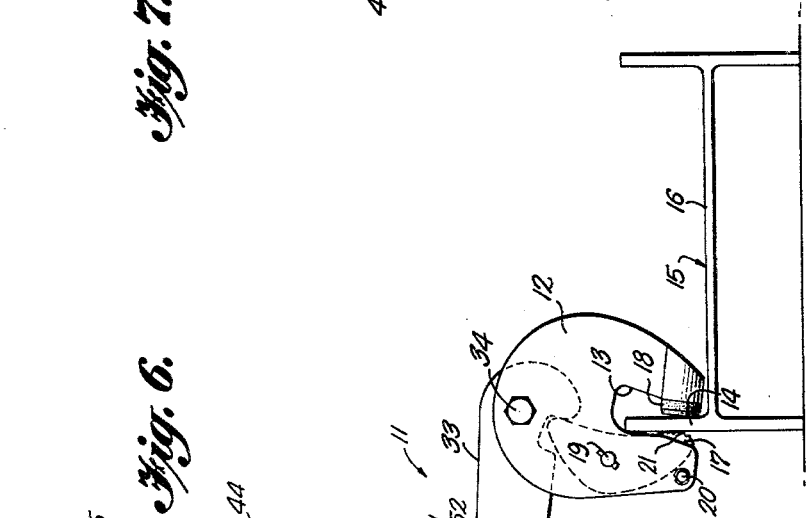

As illustrated in FIGURES 6, 7 and 8 the clamp 11 may also be employed to raise a beam such as a wide flange beam or an I-beam from a position where the web is horizontal to a position where the web is vertical. As shown in FIGURE 6, the clevis 32 is placed in an outwardly pivoted position with the lever arm 33 extending outwardly away from the web 16. The clamp 11 with the slot 13 directed downwardly is then lowered over the beam 15 so that the flange 14 extends into the slot 13 between the jaws 17 and 18. A lifting force is then applied through the chain 45 to the lifting connection 44 of the clevis 32 thereby raising the lever arm 33 to urge the jaws 17 and 18 into gripping relationship with the flange 14. Upward movement of the chain 45 results in the lifting of one end only of the beam 15 because the lifting force is applied substantially outwardly of the center of gravity of the beam. As the lifting force is continued, the beam is pivoted about one corner toward an upright position as shown in FIGURES 7 and 8. During such movement, the clevis rotates outwardly with respect to the lever arm 33 until it engages the stop pin 47. When the gripped flange 14 is nearly horizontal the lifting force is applied with respect to the bolt 34 on which the lever arm is pivoted in such a direction as to release the movable jaw 17 for movement outwardly against the stop 20. Gripping action is still maintained by torque, however, because the lifting force causes rotation of the clamp body 12 in a counterclockwise direction as viewed in FIGURE 8 to cause the jaws 17 and 19 to bite into the flange. The beam is then permitted to settle onto the flat surface of the flange opposite the gripped flange.

Similarly, the clamp 11 may be employed to move a beam which is raised with its web vertical to a position where the web is horizontal, the reverse of the sequence depicted in FIGURES 6–8. The clamp is attached to the upper flange with the swivel jaw 18 below the flange as shown in FIGURE 8. When lifting force is applied to the chain 45, there is no moment applied to the lever arm 33 but the clamp body 12 is rotated to apply a torque gripping action to the flange by the jaws 17 and 18. As the beam begins to tip, the direction of the lifting force is changed so that a moment is applied to the lever arm 33 thereby moving the movable jaw 17 into gripping relationship. The tipping action may be facilitated by moving the chain 45 in a horizontal direction in the direction to which the beam is to be lowered. When the center of gravity of the beam is moved past the pivot point of the beam on the floor the chain 45 may be lowered to place the beam in the position shown in FIGURE 6 with the web horizontal.

While the invention has been described with particular reference to a preferred specific embodiment, many other modifications may be made by persons skilled in the art without departing from the scope of the invention which is defined solely by the appended claims.

I claim:

1. A lifting clamp which comprises a clamp body defining a slot to receive an article to be lifted, a pair of opposed jaws connected to said body on opposite sides of said slot, one of said jaws being movable laterally in said slot between an inactive position and a gripping position relative to the other jaw, lever means extended transversely of such slot and having a first pivotal connection to said body, said lever means being connected to said movable jaw to urge said movable jaw toward said gripping and inactive positions when the outer end of said lever means is raised and depressed respectively, a clevis having a lifting connection at its upper end and a first transverse pin at its lower end extending in sliding pivotal relation through a slot in the outer end of said lever means, said clevis having an outwardly pivoted position relative to said lever means where lifting force applied to said lifting connection exerts a substantial moment on said lever means to bring said jaws into gripping relation, and releasable means to retain said clevis in an inwardly pivoted position relative to said lever means where lifting force applied to said lifting connection exerts substantially no moment on said lever means to leave said jaws in an inactive relation, said clevis having a second transverse pin extending across said lever means, said lever means having a cam surface engageable with said second pin to urge said clevis toward said inwardly pivoted position when lifting force is released from said lifting connection, said lever means having a longitudinal recess to receive said second pin to retain said clevis in said inwardly pivoted position, said lever slot being inclined away from said recess to permit said first pin to slide longitudinally of said lever arm and said second pin to move into said recess.

2. A lifting clamp as recited in claim 1 wherein stop means are provided to limit outward pivoting of said clevis and outward movement of said movable jaw.

3. A lifting clamp which comprises a clamp body defining a slot to receive an article to be lifted, a pair of opposed jaws connected to said body on opposite sides of said slot, one of said jaws being movable laterally in said slot between an inactive poistion and a gripping position relative to the other jaw, lever means extended transversely of such slot and having at its inner end a pivotal connection to said body, said lever means being connected to said movable jaw to urge said movable jaw toward said gripping and inactive positions when the outer end of said lever means is raised and depressed respectively, a clevis having at its upper end a lifting connection and at its lower end a pivotal connection to the outer end of said lever means, said clevis having a first position pivoted about its pivotal connection outwardly relative to said lever means where lifting force applied to said lifting connection extends along a line laterally spaced a substantial distance from said slot to exert a substantial moment on said lever means to bring said jaws into gripping relation, releasable means to retain said clevis in a second position pivoted about its pivotal connection inwardly relative to said lever means where lifting force applied to said lifting connection extends along a line substantially aligned with said slot to exert substantially no moment on said lever means to leave said jaws in inactive relation, and automatically operable means including a cam surface to cause said clevis to move from said outwardly pivoted position to said inwardly pivoted position in response to the release of the lifting force on said lifting connection as an article engaged by said jaw is lowered onto a supporting surface, said releasable retaining means being automatically engageable in response to the reapplication of said lifting force to remove the clamp from the article.

4. A lifting clamp which comprises a clamp body defining a slot to receive an article to be lifted, a pair of opposed jaws connected to said body on opposite sides of said slot, one of said jaws being movable laterally in said slot between an inactive position and a gripping position relative to the other jaw, lever means extended transversely of such slot and having at its inner end a pivotal connection to said body, said lever means being connected to said movable jaw to urge said movable jaw toward said gripping and inactive positions when the outer end of said lever means is raised and depressed respectively, a clevis having at its upper end a lifting connection and at its lower end a pivotal connection to the outer end of said lever means, said clevis having a first position wherein the upper end of said clevis is pivoted about its pivotal connection outwardly relative to said lever means where lifting force applied to said lifting connection extends along a line laterally spaced a substantial distance from said slot to exert a substantial moment on said lever means to bring said jaws into gripping relation, and releasable means to retain said clevis in a second position wherein the upper end of said clevis is pivoted about its pivotal connection inwardly relative to said lever means where lifting force applied to said lifting connection extends along a line substantially aligned with said slot to exert substantially no moment on said lever means to leave said jaws in inactive relation, the lower end of said clevis being at the outer end of said lever means in both of said positions.

5. A lifting clamp which comprises a clamp body defining a slot to receive an article to be lifted, a pair of opposed jaws connected to said body on opposite sides of said slot, one of said jaws being movable laterally in said slot between an inactive position and a gripping position relative to the other jaw, lever means extended transversely of such slot and having at its inner end a pivotal connection to said body, said lever means being connected to said movable jaw to urge said movable jaw toward said gripping and inactive positions when the outer end of said lever means is raised and depressed respectively, a clevis having at its upper end a lifting connection and at its lower end a pivotal connection to the outer end of said lever means, said clevis having a first position wherein the upper end of said clevis is pivoted about its pivotal connection outwardly relative to said lever means where lifting force applied to said lifting connection extends along a line laterally spaced a substantial distance from said slot to exert a substantial moment on said lever means to bring said jaws into gripping relation, and releasable means to retain said clevis in a second position wherein the upper end of said clevis is pivoted about its pivotal connection inwardly relative to said lever means where lifting force applied to said lifting connection extends along a line substantially aligned with said slot to exert substantially no moment on said lever means to leave said jaws in inactive relation, the lower end of said clevis being at the outer end of said lever means in both of said positions, said retaining means being automatically engageable in response to the release and reapplication of the lifting force on said lifting connection as an article engaged by said jaws is lowered onto a supporting surface and the clamp is lifted from said article.

6. A lifting clamp as recited in claim 5 wherein said retaining means comprises mutually engaging elements on said clevis and said lever means.

References Cited in the file of this patent
UNITED STATES PATENTS

| | | |
|---|---|---|
| 2,284,006 | McLellan | May 26, 1942 |
| 2,360,602 | Waldrup | Oct. 17, 1944 |
| 3,008,750 | Wansby | Nov. 14, 1961 |